US011798237B2

(12) United States Patent
Stauber et al.

(10) Patent No.: US 11,798,237 B2
(45) Date of Patent: *Oct. 24, 2023

(54) METHOD FOR ESTABLISHING A COMMON REFERENCE FRAME AMONGST DEVICES FOR AN AUGMENTED REALITY SESSION

(71) Applicant: Roblox Corporation, San Mateo, CA (US)

(72) Inventors: Mark Stauber, Bronx, NY (US); Jaeyong Sung, Bronx, NY (US); Amichai Levy, Bronx, NY (US)

(73) Assignee: Roblox Corporation, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/229,465

(22) Filed: Apr. 13, 2021

(65) Prior Publication Data

US 2021/0233321 A1 Jul. 29, 2021

Related U.S. Application Data

(63) Continuation of application No. 16/427,286, filed on May 30, 2019, now Pat. No. 11,010,977.

(Continued)

(51) Int. Cl.
*G06T 19/00* (2011.01)
*G06T 7/70* (2017.01)

(52) U.S. Cl.
CPC .............. *G06T 19/006* (2013.01); *G06T 7/70* (2017.01); *G06T 2207/10016* (2013.01); *G06T 2210/12* (2013.01); *G06T 2219/024* (2013.01)

(58) Field of Classification Search
CPC ...................... G06T 19/006; G06T 7/70; G06T 2207/10016; G06T 2210/12; G06T 2219/024
See application file for complete search history.

(56) References Cited

U.S. PATENT DOCUMENTS 10,679,428 B1 * 6/2020 Chen .................... G06F 18/2413
2011/0216060 A1 * 9/2011 Weising .................. A63F 13/00
345/419

(Continued)

OTHER PUBLICATIONS

Ray et al("An Efficient Approach for Object Detection and Tracking of Objects in a Video with Variable Background." arXiv preprint arXiv:1706.02672 (2017)) (Year: 2017).*

(Continued)

*Primary Examiner* — Xin Sheng
(74) *Attorney, Agent, or Firm* — IP Spring (57) ABSTRACT

A method includes: detecting an object in a first image; receiving a selection of the object depicted in the image; associating the object with a second device based on the selection; and, in response to the selection: recording a series of odometry data; estimating a location of the first device based on the odometry data; recording a series of images; estimating a location of the second device based on the images; calculating a first reference vector in the reference frame of the first device defining the location of the second device relative to the location of the first device; receiving, from the second device, a second reference vector; calculating a rotation and an offset between the reference vectors; and transforming the reference frame of the first device to a common reference based on the rotation and the offset.

20 Claims, 4 Drawing Sheets

Related U.S. Application Data (60) Provisional application No. 62/679,003, filed on May 31, 2018.

(56) References Cited

U.S. PATENT DOCUMENTS

| | | | | |
|---|---|---|---|---|
| 2018/0129217 A1* | 5/2018 | Asada | ............... | G05D 1/0246 |
| 2018/0164877 A1* | 6/2018 | Miller | ................. | G06F 3/012 |
| 2019/0369836 A1* | 12/2019 | Faulkner | ............ | G06F 3/04845 |

OTHER PUBLICATIONS

Sturzlinger ("Bounding volume construction using point clouds." Summer school in computer graphics in Bratislava (SCCG96) (1996): 239-246) (Year: 1996).*

Ray, Kumar S. et al., "An Efficient Approach for Object Detection and Tracking of Objects in a Video with Variable Background," arXiv: 1706.02672, 2017, 11 pages.

Sturzlinger, Wolfgang, "Bounding volume construction using point clouds," Summer school in computer graphics in Bratislava (SCCG96), 1996, pp. 236-246.

USPTO, Notice of Allowance for U.S. Appl. No. 16/427,286, dated Jan. 13, 2021, 5 pages.

USPTO, Non-final Office Action for U.S. Appl. No. 16/427,286, dated Jun. 23, 2020.

\* cited by examiner

*FIG. 3*

METHOD FOR ESTABLISHING A COMMON REFERENCE FRAME AMONGST DEVICES FOR AN AUGMENTED REALITY SESSION

CROSS-REFERENCE TO RELATED APPLICATIONS

This Application is a continuation application of U.S. patent application Ser. No. 16/427,286, filed on 30 May 2019, which claims the benefit of U.S. Provisional Application No. 62/679,003, filed on 31 May 2018, both of which are incorporated in their entireties by this reference.

TECHNICAL FIELD

This invention relates generally to the field of augmented reality and more specifically to a new and useful method for relative localization of multiple devices in the field of augmented reality.

DESCRIPTION OF THE EMBODIMENTS

The following description of embodiments of the invention is not intended to limit the invention to these embodiments but rather to enable a person skilled in the art to make and use this invention. Variants, configurations, implementations, example implementations, and examples described herein are optional and are not exclusive to the variants, configurations, implementations, example implementations, and examples they describe. The invention described herein can include any and all permutations of these variants, configurations, implementations, example implementations, and examples.

1. Method

Figure 1A:
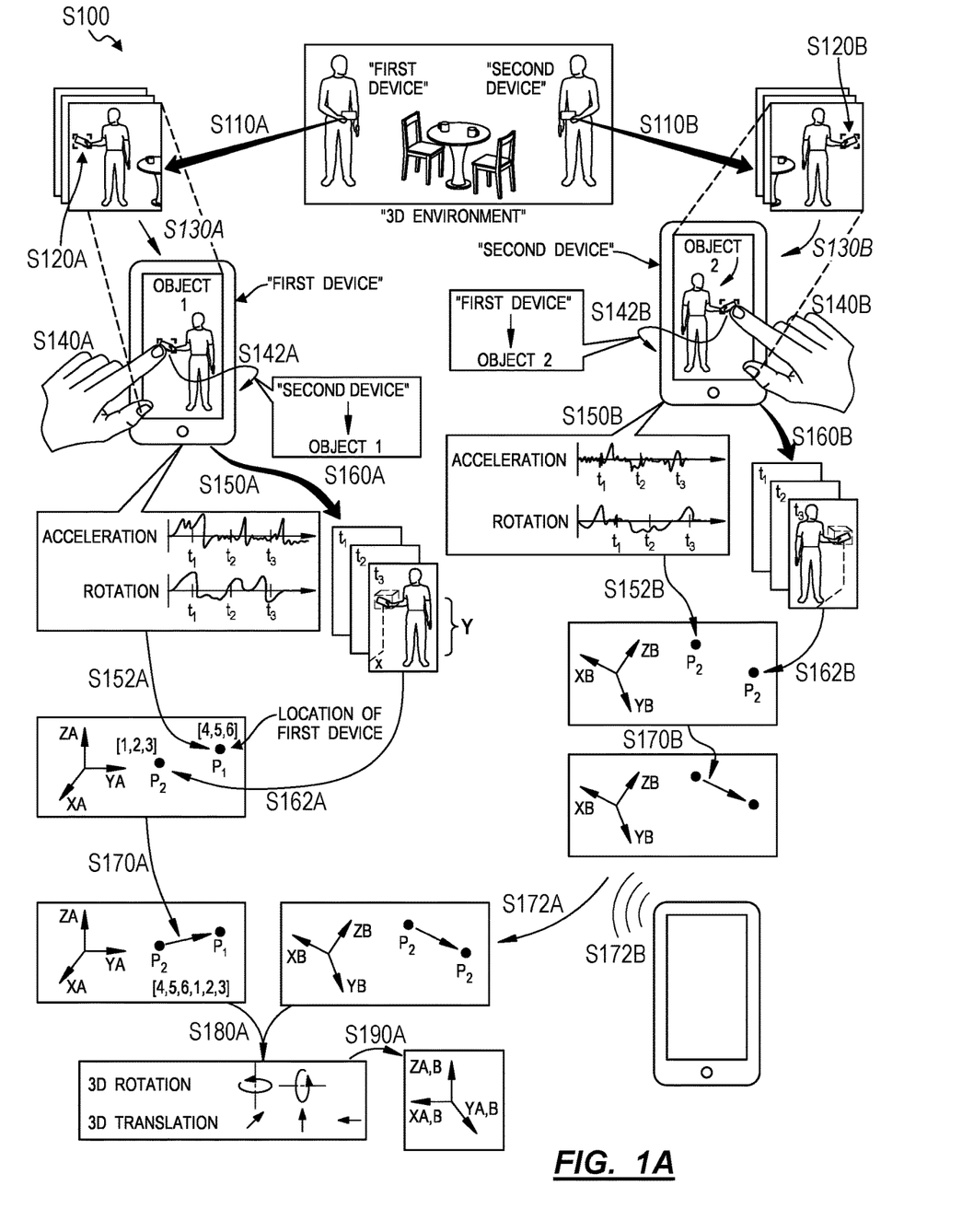
FIGS. 1A and 1B are flowchart representation of the method.

As shown in FIG. 1A, a method S100 for establishing a common reference frame amongst devices includes, at a first device: recording a first image in Block S110A; detecting a first object in the first image in Block S120A; rendering the first image in Block S130A; receiving a selection of the first object depicted in the first image in Block S140A; and associating the first object with a second device based on the selection of the first object in Block S142A. The method S100 also includes, in response to the selection: recording a first series of odometry data in Block S150A; at a first coordination time, estimating a first location of the first device in a reference frame of the first device based on the first series of odometry data in Block S152A; recording a first series of images in Block S160A; at the first coordination time, estimating a second location of the second device in the reference frame of the first device based on the first series of images in Block S162A; and calculating a first reference vector in the reference frame of the first device defining the second location of the second device relative to the first location of the first device in Block S170A; receiving, from the second device, a second reference vector in the reference frame of the second device defining the first location of the first device relative to the second location of the second device in Block S172A; calculating a rotation and an offset between the first reference vector and the second reference vector in Block S180A; and transforming the reference frame of the first device to a common reference frame matching the reference frame of the second device based on the rotation and the offset in Block S190A.

As shown in FIG. 1A, a first variant of the method S100 further includes, at a second device: recording a second image in Block S110B; detecting a second object in the second image in Block S120B; rendering the second image in Block S130B; receiving a selection of the second object depicted in the second image in Block S140B; associating the second object with the first device based on the selection of the second object in Block S142B. The first variant of the method S100 also includes, in response to the selection: recording a second series of odometry data in Block S150B; at a coordination time, estimating a second location of the second device in a reference frame of the second device based on the second series of odometry data in Block S152B; recording a second series of images in Block S160B; at the coordination time, estimating the first location of the first device in the reference frame of the second device based on the second series of images in Block S162B; calculating a second reference vector in the reference frame of the second device defining the first location of the first device relative to the second location of the second device in Block S170B; transmitting, from the second device, the second reference vector in the reference frame of the second device.

Figure 1B:
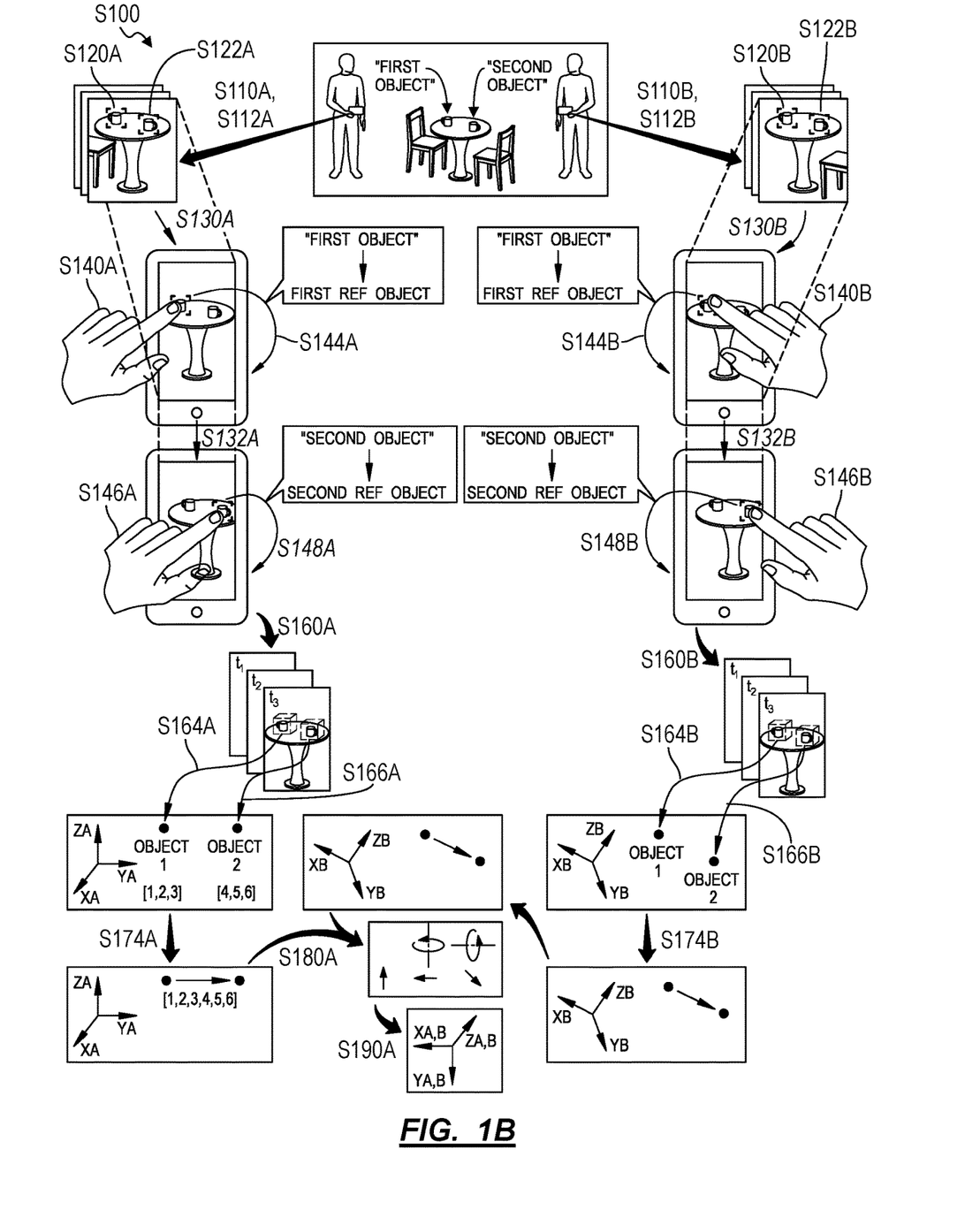

As shown in FIG. 1B, a second variant of the method S100 includes: recording a first image in Block S110A; detecting a first object in the first image in Block S120A; rendering the first image in Block S130A; receiving a selection of the first object depicted in the first image in Block S140A; identifying the first object as a first reference object based on the selection of the first object S144A; recording a second image in Block S112A; detecting a second object in the second image in Block S122A; rendering the second image in Block S132A; receiving a selection of the second object depicted in the second image in S146A; and identifying the second object as a second reference object based on the selection of the second object in Block S148A. The second variant of the method S100 also includes, in response to the selection of the first object and the selection of the second object: recording a first series of images in Block S160A; and, at the first coordination time; estimating a first location of the first reference object in the reference frame of the first device based on the first series of images in Block S164A; and estimating a second location of the second reference object in the reference frame of the first device based on the first series of images in Block S166A. The second variant of the method S100 further includes: calculating a first reference vector in the reference frame of the first device defining the second location of the second reference object relative to the first location of the first reference object in Block S174A; receiving, from a second device, a second reference vector in the reference frame of the second device defining the second location of the second reference object relative to the first location of the first reference object in Block S172A; calculating a rotation and an offset between the first reference vector and the second reference vector in S180A; and transforming the reference frame of the first device to a common reference frame matching the reference frame of the second device based on the rotation and the offset in S190A.

As shown in FIG. 1B, a third variant of the method S100 includes Blocks of the second variant and includes: recording a third image in Block S110B; detecting a third object in the third image in Block S120B; rendering the third image in Block S130B; receiving a selection of the third object depicted in the third image in Block S140B; identifying the third object as the first reference object based on the selection of the third object in Block S144B; recording a fourth image in Block S112B; detecting a fourth object in the fourth image in Block S122B; rendering the fourth image in Block S132B; receiving a selection of the fourth object depicted in the fourth image in Block S146B; and identifying the fourth object as the second reference object based on the selection of the second object in Block S148B. The third variant of the method S100 further includes, in response to the selection of the third object and the selection of the fourth object: recording a second series of images in Block S160B; and at the first coordination time, estimating the first location of the first reference object in the reference frame of the second device based on the second series of images in Block S164B; and estimating the second location of the second reference object in the reference frame of the second device based on the second series of images in Block S166B. The third variant of the method S100 further includes: calculating the second reference vector in the reference frame of the second device defining the second location of the second reference object relative to the first location of the first reference object in Block S174B; transmitting, from the second device, the second reference vector in the reference frame of the second device.

As referenced herein, reference numbers including an "A" or a "B" indicate separate iterations of the same Blocks (e.g., by a first device in a pair of devices and by a second device in a pair of devices for "A" and "B" respectively). Thus, any description with respect to the number of a Block applies to both "A" and "B" designations of that Block. For example, description with respect to Block Silo applies to both Block S110A and Block S110B.

Additionally, for ease of description, the variant of the method S100 shown in FIG. 1A is referred to herein as the "inter-device variant," while the variant of the method S100 shown in FIG. 1B is referred to herein as the "inter-object variant"

2. Applications

Generally, Blocks of the method S100 can be executed by a system, which can include a native application or web browser (hereinafter an "application")— executing on one mobile computing device (hereinafter a "device") or on a pair of devices—and/or in coordination with a remote server—to establish a common reference frame between a pair of devices in order to facilitate a shared augmented reality experience for the user of each device. More specifically, the method S100 enables two devices to synchronize reference frames in three-dimensional (hereinafter "3D") space according to an intuitive user-experience, thereby facilitating collaborative experience in an augmented reality setting without the typical overhead for scanning and localization within a 3D environment. For ease of description, the method S100 is described herein with reference to a device or a pair of devices executing steps of the method S100. However, Blocks of the method S100 can be executed by an application executing on a device, by an instance of the application running on each device in a pair of devices, or by a remote server connected to the pair of devices (e.g., via the internet or local area network).

In particular, the system can leverage mutual agreement between two users regarding one or more reference objects in an environment. Therefore, a device of each user (in the pair of users) renders an interface for each user to identify or designate the agreed-upon reference objects in a series of two-dimensional (hereinafter "2D") images (i.e. a video feed) of the environment recorded by each user's respective device such as by tapping on the reference objects when they appear in the video feed on a touchscreen of the device or providing an input when a detected reference object is highlighted in the interface. Each device can then implement computer vision, artificial intelligence, deep learning, or similar methods and techniques to: detect—directly or indirectly—the 3D location of the designated reference object relative to the device (i.e. in the reference frame of the device) based on concurrent 2D images and odometry data collected by the device; construct a six degree-of-freedom (hereinafter "DOF") reference vector relative to the device; receive an equivalent reference vector from the second device in the pair of devices; and transform the reference frame of the device to a common reference frame based on a relative offset and rotation between the equivalent reference vectors.

In the inter-device variant of the method S100, a first device executing the method S100 can prompt the user to identify (via a user interface) the second device as the first reference object. Likewise, the second device can prompt the user to identify the first device as the second reference so that each device in the pair of devices can construct a reference vector between the two devices. In one implementation of the inter-device variant of the method S100, the device can estimate the location of the second device by detecting and tracking the user of the second device and estimating the location of the device relative to the user.

In the inter-object variant of the method S100, the system can prompt each user of the pair of devices to identify two mutually recognized reference objects in the 3D environment so that each device can construct a reference vector between the two reference objects.

In both of the above variants, both devices in the pair of devices can construct or calculate a reference vector that describes the same positional relationship of two objects in the 3D environment, whether the reference objects are two mutually recognized objects located in the 3D environment or the two devices themselves.

Once a device has calculated a reference vector, the device can access a concurrent second reference vector (e.g., via a direct wireless connection between the pair of devices or over a local or wide area network) calculated at the second device in order to calculate a rotation and offset between the reference frames of the two devices. The system can then choose a single common reference frame for the pair of devices, which can include a reference frame of one of the devices or a third reference frame defined relative to the reference vectors.

Upon establishing a common reference frame for the pair of devices, each device can: record odometry data to track its position in the reference frame; detect, characterize, and localize objects in the 3D space in order to add each localized object to a localization map for the 3D space; and define augmented reality assets in the 3D space for display and/or overlay at other devices operating according to the established common reference frame.

The method S100 is described herein in the context of a pair of devices executing the method S100. Generally, description with respect to "a device" or "the device" is applicable to "a first device" or "a second device" in the pair of devices.

The method S100 is described herein in the context of a pair of mobile computing devices. However, the method S100 can be executed by any system equipped with a camera and/or inertial sensors such as smartphones, tablets, virtual reality headsets, augmented reality headsets (i.e. smart-glasses) drones, or vehicles.

3. Device Reference Frame

Generally, upon initiating an augmented reality session, each device defines a reference frame (i.e. coordinate system) with which to define the locations of various objects in a 3D environment. Because each device can be mobile within the 3D environment, the device can define a global reference frame (e.g., not relative to the position or orientation of the device). For example, a device can define a reference frame based on its position and orientation upon initiating an augmented reality session such as by defining a vertical axis according to a current gravity vector, a first horizontal axis based on a forward direction in its current orientation and normal to the vertical axis, and a second horizontal axis normal to each of the other two axes. Thus, as the device moves through 3D space and records odometry data, the device's location and orientation, defined relative to the reference frame, can change.

Upon detecting objects in the 3D environment, defining augmented reality assets in the 3D environment, or defining its own location, the device tracks all locations and orientations in terms of its current reference frame. Therefore, in order to facilitate a shared augmented reality session between two or more devices, each device participating in the session adopts a common reference frame such that objects located relative to the common reference frame can be located by all devices that have adopted the common reference frame.

A device or pair of devices execute Blocks of the method S100 in order to align reference frames, thereby enabling shared augmented reality sessions between the two devices.

4. Object Detection and Localization

Generally, each device executes Blocks of the method S100 in real-time to detect, track, and characterize objects in 2D images—recorded by a single 2D color camera in the device—in (near) real-time in order to identify potential reference objects in a 3D space and prompt the user to select these detected objects in order to identify them as a reference object.

For example, the device can: access a series of 2D images recorded by a camera integrated into the device; implement visual-inertial odometry, structure from motion, deep learning, or similar techniques to construct a 3D manifold of surfaces in the field of view of the camera based on features detected in this stream of 2D images and based on motion of the device over time; implement artificial intelligence, deep learning, or other computer vision techniques to detect and track an object across these 2D images; implement ray casting techniques to estimate distances from the camera to the object projected from a current 2D image projected onto the 3D manifold; calculate a 3D location (i.e., horizontal distance, vertical distance, and depth) of the object relative to the reference frame of the device at the time this 2D image was recorded based on this ray; and repeat this process for each subsequent 2D image recorded by the camera.

In this example, the device can then combine 3D locations of this object derived from a series of consecutive 2D images in this video feed into one composite position of the object relative to the camera based on tracked motion of the device over the period of time that this set of 2D images was recorded, such as in the form of a composite 3D bounding box defined relative to the camera and predicted to fully and tightly encompass the object.

In particular, by combining 3D positions of one object derived from multiple consecutive images, the device can reject noise and increase accuracy of the calculated 3D position of the object relative to the camera over this small set of consecutive 2D images. However, by limiting the number of 2D images in this set, the device can finalize its calculation of the next position of the object relative to the camera with limited latency (e.g., at a rate of 8 Hz, or 124 milliseconds between consecutive object location calculations, for sets of three consecutive frames recorded by the camera operating at a frame rate of 24 Hz).

In one implementation described in additional detail below, a device executing Blocks of the method S100 can estimate a 3D location of an object by: identifying an object in a first series of images based on an image classifier; estimating a 2D bounding box encompassing the object for each of the first series of images; ray casting within the 2D bounding box to generate a 3D point cloud for each of the first series of images; estimating a 3D bounding box encompassing the 3D point cloud for each of the first series of images; calculating the centroid of each 3D bounding box; and estimating the location of the object based on the location of the centroid.

The device is described below as executing these Blocks of the method S100 to merge object location estimates from discrete, non-overlapping sets of consecutive 2D images. However, the device can implement similar methods and techniques for any other number of overlapping or non-overlapping sets of consecutive 2D images recorded by the camera.

4.1 Object Detection and Tracking

Figure 2:
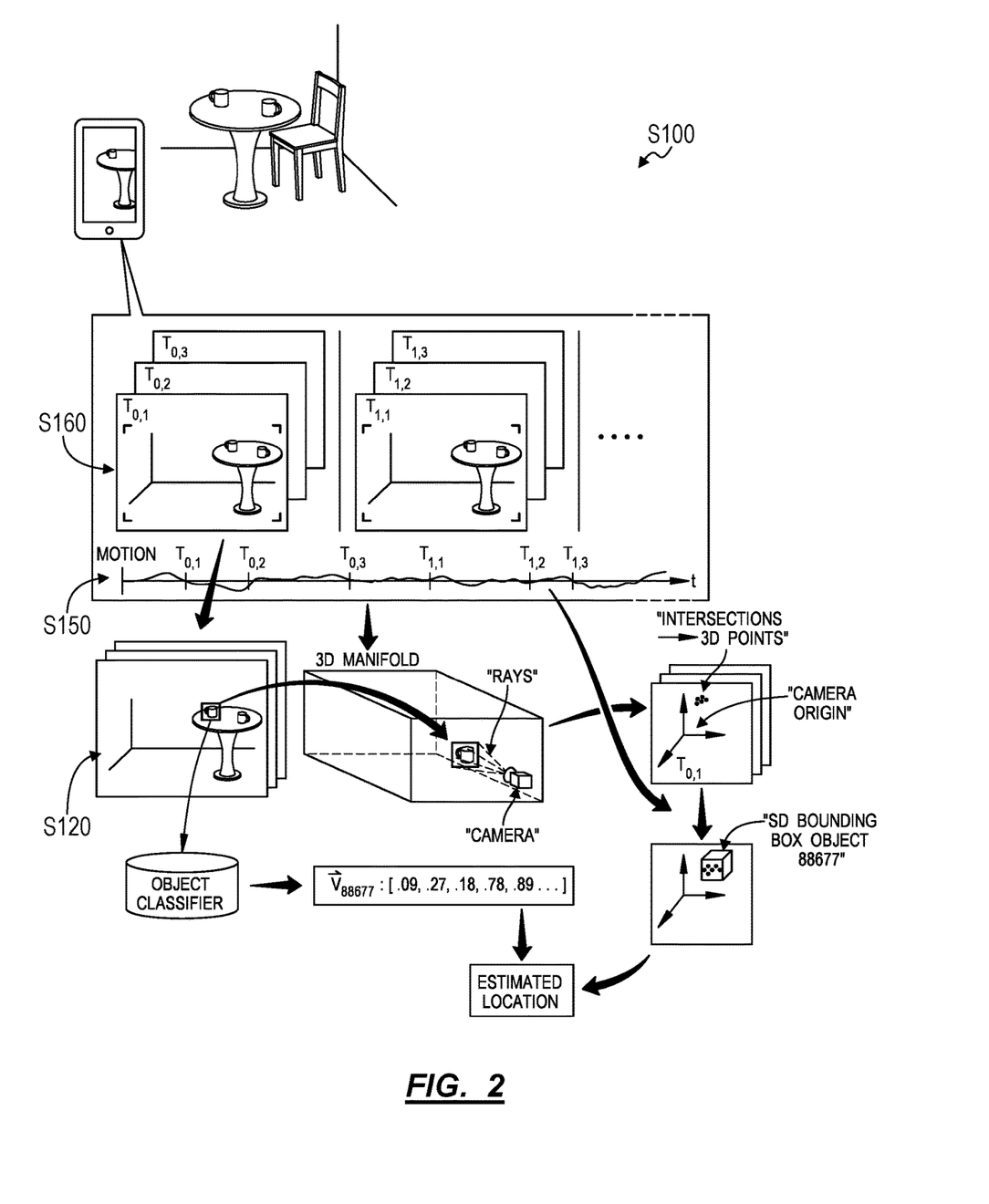
FIG. 2 is a flowchart representation of the method.

As shown in FIG. 2, while the application is open and active on a device, the device can actively record 2D images in Blocks S110 and S112 and/or access a stream or series of 2D images recorded by a 2D camera in the device. The device can then: implement object detection techniques to detect objects in each 2D image in Blocks S120 and S122; and implement object tracking techniques to link like objects detected across this stream of 2D images and to track objects throughout this series of 2D images.

The device can also leverage object trajectory information derived from preceding frames to predict locations of this object in frames in the current set and then link objects detected in 2D images in the preceding and current sets based on 2D spatial proximity to locations predicted by this object trajectory at corresponding frame times, such as described below.

4.2 Device Motion

As shown in FIG. 2, while accessing and processing 2D images recorded by the camera, the device can also track 3D motion of each device in the pair of devices such as in Block S150. For example, the device can record accelerations and angular velocities output by accelerometer and gyroscope sensors, respectively, integrated into the device, and store these timestamped motion data (i.e. odometry data). The device can also implement dead reckoning techniques to derive translational and rotational changes in the position and orientation of the device between recordation of consecutive 2D images in Block S152.

4.3 Single-Frame Object Volumetric Approximation

Each device in the pair of devices can: implement visual-inertial odometry, structure from motion, or similar techniques to derive depth information from a series of 2D images recorded over a period of time and based on motion information (e.g., changes in position and orientation) of the device tracked over this period of time; and then construct a 3D manifold or other virtual 3D representation of surfaces in the field of view of the 2D camera. (Alternatively, the device can access similar "loose" 3D perception information generated and output by an operating system executing on the device.)

Upon detecting an object in a first 2D image—in the set of consecutive frames recorded by the camera—the device can: calculate a 2D bounding box around this object in the first 2D image; and project the 2D bounding box and the object depicted in two dimensions in the first 2D image onto the 3D manifold generated from preceding 2D images and concurrent motion of the device and defined relative to the camera. The device can then implement ray casting techniques to: virtually project a first ray from the position of the camera into the 2D bounding box projected on the 3D manifold and determine whether the first ray intersects the projection of the object onto the 3D manifold. If so, the device can: calculate a distance from the position of the camera to a point on the 3D manifold at which the first ray intersects the projection of the object; and store the lateral, longitudinal, and depth positions of this intersection relative to the camera. The device can repeat this process for many rays cast from the location of the camera into the 2D bounding box projected onto the 3D manifold. Furthermore, upon calculating lateral, longitudinal, and depth coordinates of the object relative to the camera of the device, the device can transform these positional coordinates to a location in the reference frame of the device based on the 3D offset and rotational offset of the device relative to the origin of the device's reference frame based on odometry data recorded by the device.

The device can then populate a 3D graph with a cluster of 3D points (i.e. a 3D point cloud)—defining lateral, longitudinal, and depth locations in the reference frame of the device—wherein each point represents an intersection of a ray, virtually cast from the camera, on the object detected in the 2D image and projected onto the 3D manifold. The device can subsequently calculate a 3D bounding box that encompasses this cluster of 3D points in the 3D graph and define this 3D bounding box in the reference frame of the device.

The device can repeat this process for this same object detected in the remaining 2D images in the current series of images in order to generate additional bounding boxes defined in the reference frame of the device and encompassing a cluster of 3D points representing this object.

4.4 Composite 3D Bounding Box

Generally, as shown in FIG. 2, the device can estimating the location of an object—such as in Blocks S162, S164, and S166 and subsequently compile these lower-accuracy 3D bounding boxes calculated for the object from individual 2D images—in this designated set of consecutive 2D images—into a higher-accuracy 3D location at the object and/or into a higher-accuracy 3D bounding box tightly containing this object based on absolute motion of the device between recordation of these 2D images and based on the 2D images themselves. Thus, the device can record a first series of images in Block S160 and estimate a location of a reference object relative to the first device (e.g., in a reference frame of the first device) based on the first series of images in Block S162.

For example, the device can: access a first 2D image recorded at a first time; detect and calculate a first 3D bounding box around a first object in the first 2D image; access a second 2D image recorded at a second time; detect and calculate a second 3D bounding box around the first object in the second 2D image; access a third 2D image recorded at a third time; and detect and calculate a third 3D bounding box around the first object in the third 2D image. The device can also: calculate a first change in location of the device from a first timestamp of the first 2D image and a second timestamp of the second 2D image; and calculate a second change in location of the device from the second timestamp to a third timestamp of the third 2D image. The device can then: locate the first 3D bounding box within the reference frame of the device with an origin of the reference frame located relative to the location and orientation of the device at the first timestamp; locate the second 3D bounding box within the reference frame based on the first change in position of the device; and locate the third 3D bounding box within the 3D graph based on a sum of the first change and the second change in position of the device. Finally, the device can calculate a volumetric average of these bounding boxes, a volumetric intersection of these bounding boxes, or any other volumetric combination of these bounding boxes within the reference frame of the device to calculate a composite bounding box characterized by greater accuracy and a greater likelihood of tightly containing the object if projected into the reference frame of the device.

The device can therefore combine frame-specific 3D bounding boxes around the object—derived from 2D images from the current set of 2D images—into one composite 3D bounding box.

In this implementation, the device can also: calculate a preceding change in position of the device from the first timestamp of the first 2D image in this set and a timestamp associated with a preceding 3D composite bounding box; and locate a preceding composite 3D bounding box calculated from the preceding set of 2D images within the 3D graph based on the preceding change in position of the device. The device can then calculate the composite 3D bounding box based on the first, second, and third bounding boxes and the preceding composite 3D bounding box, such as with the latter assigned a lower weight.

Alternatively, the device can implement similar methods and techniques: to locate 3D point clouds—derived from individual frames in the current set—into the 3D graph based on estimated changes in position and orientation of the camera over a period of time that the corresponding 2D images were recorded; and to then calculate and store a 3D composite bounding box that encompasses this aggregated set of 3D points.

4.5 Location Confidence Score

As the device executes the foregoing processes to estimate the location of an object (e.g., a reference object)—such as in the form of a single 3D point contained by the object or in the form of a bounding box around the object—in subsequent sets of consecutive frames, the device can also calculate confidence scores for the estimated location of the object.

In one implementation, the device initially outputs a low confidence for the presence and location of the object when first detected in a 2D image. However, as the device records additional 2D images and as the device detects and tracks this object across these next 2D images, and thus amasses data specific for this object, the device can then estimate a trajectory of the object in real space. For example, the device can: calculate a nominal path of the object—relative to the camera in the device—from centroids of 3D composite bounding boxes calculated for the object over a series of sets of consecutive 2D images; implement dead reckoning techniques to transform acceleration and angular velocity data collected by sensors in the device during recordation of these 2D images into a path of the camera over this period of time; subtract the path of the camera from the nominal path of the object to calculate an absolute path of the object over this period of time; and then extrapolate an absolute trajectory of the object from this absolute path. (The device can additionally or alternatively implement visual odometry or other computer vision techniques to estimate the trajectory of the object.)

In the foregoing implementation, based on the absolute trajectory of the object and the change in position and orientation of the camera from the current frame to a next frame (or next set of 2D images), the device can extrapolate a 2D and/or 3D position of the object at the reference time of a next set of consecutive 2D images recorded by the camera. Upon detecting the object and calculating its 2D or 3D location in this next set of 2D images, the remote server can calculate a difference (e.g., a 2D or 3D distance) between the extrapolated and calculated 2D and/or 3D locations of the object at the current time. The device can then calculate a location confidence score for the calculated location of the object at this time as a function of (e.g., proportional to) this difference.

The device can additionally or alternatively calculate a location confidence score for the composite 3D location calculated from a current set of consecutive 2D images as a function of proportions of 2D image-specific bounding boxes—generated from individual frames in this set of 2D images—that overlap.

Once the device calculates a location confidence score for presence and location of the object that exceeds a threshold score (e.g., 40%), the device can: project the 3D bounding box around the object and/or locate an augmented reality asset (e.g., text, an icon, an animation) over the object depicted in the next 2D image recorded by the camera; and then render this augmented 2D image on a display of the device in substantially real-time. For example, the device can thus selectively render an augmented reality asset on or near an object in response to calculating a location confidence score exceeding a threshold score in order to limit presentation of augmented reality content on or adjacent false-positive objects detected in these 2D images.

Additionally or alternatively, the device can establish a distance interval (e.g., in each dimension) for the composite 3D location of an object based on the variance in component 3D locations calculated for an object over a series of 2D images. Thus, the device can estimate that the composite 3D location of an object exists within a distance interval (or radius) of a particular 3D centroid of the object.

However, the device can calculate and update the location confidence score for the object in any other way.

4.6 Object Characteristics

The device can also classify the object as either static (e.g., "immutable") or dynamic (e.g., mobile, "mutable") based on the absolute path of the object. For example, while the device calculates a "null" path for the object, the device can label the object as static or immutable. While continuing to track this object over a subsequent series of 2D images, the device can label the object as dynamic or mutable once the device determines that the absolute path of the object is no longer null, update preceding labels for the object to reflect the object as dynamic or mutable, and preserve this dynamic or mutable label for the object into the future (and/or for the general object classification or category label associated with this object, as described below).

Furthermore, the device can attach additional characteristics to the object, such as: characteristics of surfaces that define the object; the structure of the object; text or symbols detected on the object; and/or colors present on the object; etc.

In one implementation, the device can track reference objects that are classified as mutable and establish a common reference frame based on the mutable reference objects (e.g., humans or devices) by controlling the concurrency between the estimated locations for the mutable reference object. At a particular coordination time the device can access the most recent (e.g., current) location for a reference object in the reference frame of each of the pair of devices for which the device is establishing a common reference frame and calculate a reference vector based on the most recent location of the reference object. Additionally or alternatively, the device can calculate a reference vector only after estimating the location of a reference object with confidence greater than a threshold confidence (e.g., 50%). Furthermore, the device can calculate a reference vector after estimating the location of a reference object to within a threshold distance interval (e.g., to within one foot). In another implementation, the device can adjust the threshold distance interval based on a detected size of the object, whether the object is static or mutable, or any other characteristic of the object. For example, the device can increase the threshold distance interval for a large object relative to a small object or for a mutable object relative to a static object.

4.7 Object Classifier and Object Scores

As shown in FIG. 2, the device can also implement an object classifier—such as in the form of an artificial intelligence or deep learning model—configured to characterize the object based on likeness to one or more predefined object classes.

In one implementation, the device executes a deep learning classifier trained to output a likeness score of an object for each object class in a prepopulated set of (e.g., 90) unique object classes. For example, the device can pass a region of the current 2D image containing a detected object into the deep learning classifier, and the deep learning classifier can return an "object signature" including an array of scores ordered according to a predefined sequence of class types, wherein each value in the object signature represents a degree (or a "score") for a likeness between the object and a corresponding object class in this prepopulated set of object classes. In this example, an object signature for the object can thus include: a highest score that corresponds to a primary object class (e.g., one of a cup, a wall, a human, a chair, a table, a shoe, a hat, food, a plant, etc.) most likely to include the object; and a combination of lower scores that correspond to secondary object classes and that in combination suggest a species or a uniqueness of the object. Alternatively, the device can define an object signature as a particular intermediate layer of a deep learning image classifier (e.g., one layer before the classification layer).

Therefore, the device can generate an object signature in the form of an array of scores (e.g., contained in a vector). However, the device can generate an object signature in any other format.

4.8 Centralized Object Repository

Upon classifying an object, the device can also upload data pertaining to an identified object to a centralized object repository in order to further characterize objects detected by the device. More specifically, the device can upload, to the centralized object repository, contextual data associated with a particular object classification (or range of object signatures). For example, the device can: indicate whether an object is static or mobile; list other objects identified proximal to the object; record interactions between the user and the object via an augmented reality executing on the device; list augmented reality assets generated in association with the object; and/or indicate a location of the object (globally or within a common reference frame).

4.9 Object Confidence Score

Figure 3:
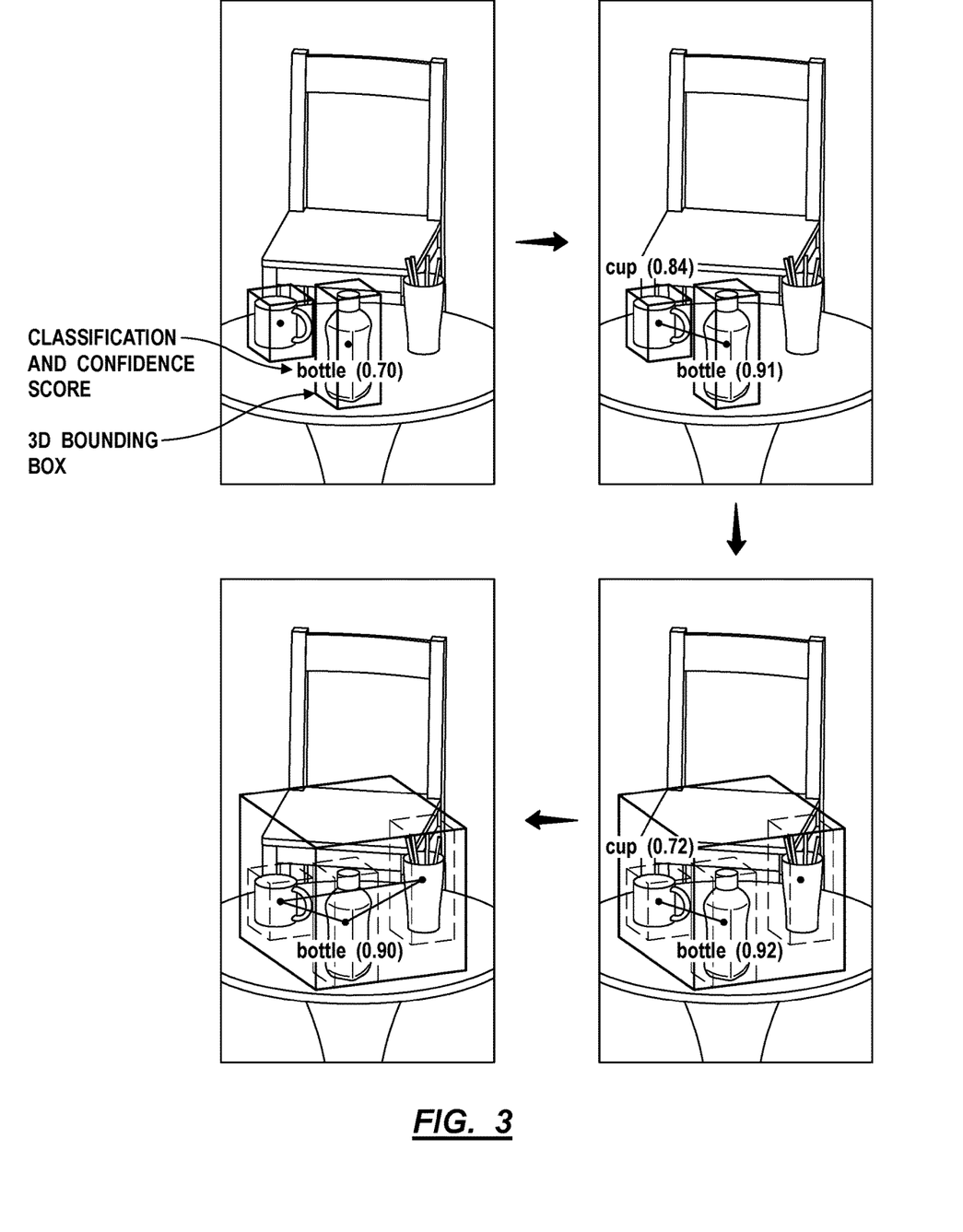
FIG. 3 is a flowchart representation of one variant of the method.

As shown in FIG. 3, the device can further calculate an object confidence score proportional to consistency (e.g., as an inverse function of variance) of object class scores calculated for an object over a sequence of 2D images. For example, the device can: increase an object confidence score for an object following each consecutive 2D image for which the device consistently identifies the object to be of one particular object class; and decrease the object confidence score for the object following each consecutive 2D image for which the device determines that the primary object class of the object has changed.

In another example, in response to recording a 2D image, the device can calculate scores or correlations for each predefined object class to the object detected in this 2D image. For each subsequent 2D image (or set of consecutive 2D images), the device can: calculate the variance in scores for each object class calculated for this object over these 2D images; normalize this variance by dividing by a number of these consecutive 2D images; and adjust the object confidence score for the object as an inverse function of normalized variances for these object classes over this set of 2D images.

However, the device can calculate and update the object confidence score for the object in any other way.

4.10 Human Detection

Generally, a device executing the method S100 can detect a human in images as proxies for the location of another device held by the detected human in order to more quickly estimate the location of another device in a series of images. Therefore, the method S100 can include: detecting a human in an image; receiving a selection of the human in the image as a proxy for a second device; identifying the human as a user of the second device based on the selection of the human; estimating the centroid of the human; and estimating the position of the second device relative to the centroid of the human.

Thus, the device can execute a classifier to detect humans in images recorded by the device and then estimate the location of the human's device in order to establish a common reference frame with that device. In one implementation, the device can estimate a typical offset and/or orientation of a device relative to a human when being held for the purpose of experiencing an augmented reality session. For example, the device can estimate the location of a device as one twelve inches in vertical dimension and twelve inches in a horizontal dimension from the centroid of a human.

In one implementation, the device can define an object signature for a particular human associated with a device in order to identify the same user (and by extension the device of the user) in subsequent images of the 3D environment and therefore recalculate a reference vector by repeating Blocks of the method S100 in order to reestablish a common reference frame.

4.11 Device Detection

Generally, the device can also directly detect the location of a second device, as opposed to indirectly detecting the location of the second device by first detecting a human and estimating the position of the device relative to the location of the detected human. In one implementation, the device can execute an image classifier to detect the presence of a smartphone in the hand of the user or a particular augmented reality headset. Alternatively, the device can prompt the user of each device participating in the shared augmented reality session to apply a visual indicator to the backside of each device. Thus, when two users are facing each other, each device can identify the other device by detecting the visual indicator affixed to the backside of the device.

5. Reference Objects

Generally, the device establishes a common reference frame between at least two devices by identifying reference objects in the 3D environment in which the devices are located. The device can then calculate a first reference vector between reference objects and/or the reference object and the device itself. At the second device, which is also executing Blocks of the method S100, the device can detect and locate the same reference objects in the 3D environment or locate the first device, thereby enabling the second device to calculate a second equivalent reference vector that expresses the same spatial relationship between reference objects as the first reference vector.

More specifically, the device can execute the method S100 in two main variants: the inter-device variant and the inter-object variant. In the inter-device variant, each device in the pair of devices prompts the user of each device to select an opposing device as a single reference object. In the inter-device variant, each device in the pair of devices identifies the second device in the pair of devices as a reference object and calculates a reference vector as the vector between the two devices. In the inter-object variant, each device in the pair of devices prompts each user to verbally agree to use two reference objects in the 3D environment as reference objects. Each device in the pair of devices can then identify the location of each of these reference objects and calculate a reference vector as the vector between these two reference objects. Therefore, each device calculates a vector that expresses the spatial relationship between the two reference objects in its own reference frame.

In the inter-object variant, the device can estimate the location of a reference object that is mutable or static in the 3D environment. Regardless of the characterization of the object, the device can estimate concurrent locations for each reference object; and, in response to estimating the location of each reference object to within a threshold confidence score and/or to within a threshold distance interval, calculate a reference vector between the reference objects.

In one implementation of the inter-object variant of the method S100, the device can estimate the location and orientation of a single reference object instead of estimating the location of a first reference object and the location of a second reference object. Therefore, the device can calculate a six DOF reference vector based on the single reference object.

6. Video Feed and User Interface

Generally, in Blocks S130 and S132 the device can render a video feed including the series of images recorded by the device in real time in order to enable the user to input a selection of a reference object in the 3D environment depicted in the video feed. Additionally, the device can augment the video feed to indicate detected objects in the 3D environment that could be a reference object. The device can then receive a user input identifying which of the detected objects is a reference object. More specifically, the device can: detect an object in an image or video feed; augment the image or the video feed depicting an object with a graphical identification of the object in the image or the video feed; and render the augmented image or augmented video feed.

6.1 Reference Object Designation and Selection

Generally, the device can display the abovementioned video feed interface in order to receive a selection (in Blocks S140 and S146) of a reference object from the user. Thus, the device, in Blocks S142, S144, and S148, can identify an unidentified object depicted in the video feed of the device as a reference object that may have been verbally agreed upon by two users seeking to establish a common reference frame for their respective devices. In the inter-device variant of the method S100, in Block S142, the first device can, in response to receiving a selection from a user, identify a detected object as the second device (or a human associated with the second device). In the inter-object variant of the method S100, a device in the pair of devices can identify a first reference object in response to receiving a first selection of that object from a user and identify a second reference object in response to receiving a second selection of that object from the user, in Blocks S144 and S148 respectively.

The device can receive a selection according to standard user input methods, which can vary depending on the type of the user's device. In one implementation, the device is a smartphone or tablet and the device receives the selection of the reference object from an image or a real-time video feed by detecting a touch gesture over an object depicted in the image or the video feed displayed on the device. In an alternative implementation, the device is an augmented reality headset and the device can receive a selection of a reference object by: highlighting with a visual indicator, via a display of the augmented reality headset, an object detected by the device; and detecting an input gesture, button press, or any other user input coinciding with the visual indicator.

Additionally or alternatively, the device can receive a scrolling input gesture to highlight another object detected by the device within the field of view of the real time video feed or latest image. In this alternative implementation, the user may "scroll" through multiple detected objects before choosing and selecting a reference object.

6.2 Reference Object Verification

In one implementation, a first device in the pair of devices can interface with a second device in the pair of devices in order to verify that both devices are identifying the same reference objects before each device calculates a reference vector. More specifically, the first device can calculate an object signature for each reference object identified by the first user, while the second device can calculate an object signature for each reference object identified by the second user. The first device can then transmit the object signatures to the second device in the pair of devices. Upon receiving remote object signatures calculated by the second device, the first device can compare the received object signatures to its own local object signatures. In response to a substantial match between the received remote object signatures and the first device's local object signatures, the first device can proceed in calculating a reference vector between the reference objects or between the reference object and the device. In response to a mismatch between the local and remote object signatures, the device can prompt the user to identify new reference objects and/or verbally verify that the users of both devices in the pair of devices have identified the same reference objects in the 3D environment.

In one implementation, the device can also distinguish a first reference object from a second reference object by matching the object signatures of the reference objects. Therefore, a first device in a pair of devices can define a first object signature of a first reference object and a second object signature of a second reference object before transmitting these object signatures to a second device. The second device can then calculate two object signatures corresponding to the two reference objects and identify the reference objects as the first reference object and the second reference object by matching the two object signatures with the first object signature and the second object signature.

7. Reference Vector Calculation

Generally, in Blocks S170 and S174 the device calculates a reference vector between concurrently-estimated (e.g., at coordination time) locations of reference objects in the 3D environment. More specifically, the device can communicate with the second device to define a coordination time at which each device will calculate a reference vector. At the coordination time (e.g., subsequent to a frame concurrent with the coordination time), the devices can access a most recent estimated location for each reference object and calculate a vector between the estimated locations in the reference frame of the device. In the inter-device of the method S100 shown in FIG. 1A, the device itself acts as a reference object by estimating its own location in its reference frame via odometry data collected over time—thus, in the inter-device variant of the method S100, the reference vector defines a spatial relationship between the first device and the second device. In the inter-object variant of the method S100 shown in FIG. 1B, each device calculates a reference vector that defines the spatial relationship between two reference objects that are detected in the 3D environment.

In particular, the device calculates a six DOF reference vector that defines a location and an orientation. Therefore, the device can represent a reference vector as a six-value array defining each of the six DOF of the reference vector.

The device can define the reference vector using any coordinate system. For example, in one implementation the device represents a reference vectors as the appended coordinates of each reference object's estimated location—such as [1, 2, 3, 4, 5, 6] for a reference vector between locations [1, 2, 3] and [4, 5, 6] in the reference frame of the device. Alternatively, the device can define the reference vector by its starting location (in 3D space), its heading (azimuthal and polar angle), and/or its length.

When executing the inter-device variant of the method S100, the device can estimate a 3D location for itself in its own reference frame and a 3D location for the second device before calculating a reference vector between the two locations according to standard trigonometry.

In the inter-object variant of the method S100, the device can estimate the locations of the reference objects in the device's reference frame and subsequently calculate a reference vector extending from the estimated location of the first reference object to the estimated location of the second reference object, wherein the first reference object and the second reference object have been distinguished by the user of each device during the reference object identification process described above.

8. Transformation to Common Reference Frame

Generally, in Blocks S180 and S190, once both devices in the pair of devices calculate reference vectors (i.e. a first and a second reference vector) that define the same spatial relationship in different reference frames, the first device can align the reference frame of the first device with the reference frame of the second device or the second device can align the reference frame of the second device with the reference frame of the first device. More specifically, the pair of devices can communicate (e.g., amongst themselves and/or with a remote server) to select a common reference frame from between the reference frame of the first device and the reference frame of the second device. The device corresponding to the reference frame that is selected for transformation to the common reference frame can then receive, from the second device in the pair of devices, a second reference vector in Block S172. The device that is not selected can then rotate and/or transpose its reference frame to align with the common reference frame by: calculating a rotation and an offset between the first reference vector and the second reference vector; and transforming the reference frame of the first device to the common reference frame matching the reference frame of the second device based on the rotation and the offset.

In particular, the first device can calculate a rotation matrix and a translation matrix between the first reference vector and the second reference vector; and apply the same rotation matrix and translation matrix to a vector representing the origin of the reference frame of the first device. Therefore, the locations of any objects already detected in the reference frame of the first device can be translated and/or rotated according to the translation matrix and the rotation matrix respectively. Furthermore, the first device can define any additional locations (e.g., for newly localized objects) in the common reference frame instead of the first reference frame.

In one implementation, a remote server or one device from a set of devices engaged in a shared augmented reality session can access a first number of devices operating within the first reference frame and a second number of devices operating within the second reference frame. The remote server or device can then select the reference frame with the higher number of devices operating on the reference frame as the common reference frame between the first device and the second device.

9. Localization Map

Generally, upon establishing a common reference frame for the first device and the second device, each device in the pair of devices can: detect and locate objects in the 3D environment; and append the location of an object to a localization map of the 3D environment represented according to the common reference frame of the pair of devices. More specifically, each device in the pair of devices can: continue recording a series of images of the 3D environment; detect an object in the 3D environment; estimate the location of the object in the common reference frame; and add the object to a localization map for the common reference frame. Thus, upon establishing a common reference frame for a shared augmented reality experience, each device can contribute to mapping the 3D environment, thereby improving the shared augmented reality session and facilitating quicker re-localization of the devices in the shared augmented reality session or any new devices that engage in the shared augmented reality session.

In one implementation, each device maintains a local copy of the localization map for the common reference frame and can update the localization map with newly-detected objects. Each device can then synchronize its localization maps with a localization map on a remote server. Furthermore, the remote server can track the rotations and offsets between different common reference frames corresponding to various shared augmented reality sessions in order to develop a global localization map of a larger 3D region. Alternatively, devices that are engaged in a shared augmented reality session can maintain a localization map for the shared augmented reality session and synchronize the localization map across the devices engaged in the shared augmented reality session.

In another implementation, each device can calculate an object signature for each detected object and record the object in the localization map in association with the object's object signature, thereby improving positive identification of the object by another device in the augmented reality session and consequently improving re-localization of the object in the 3D environment upon movement of the object in the 3D environment.

In yet another implementation, each device can: characterize an object as static or mutable; and add an object to a localization map in response to characterizing the object as static. Thus, devices in a shared augmented reality session can only add objects to the localization map that are unlikely to move. Alternatively, devices in a shared augmented reality session can add all detected objects to the localization map (according to the most recent estimated location of an object) and store the object in the localization map in association with the object's characterization. Therefore, devices can distinguish static objects, which can be used for re-localization of the device in the common reference frame, from mutable objects, which can be augmented by the device as part of the augmented reality session but would not typically be involved in re-localization.

Furthermore, a device in the pair of devices can add any reference objects defined during execution of Blocks of the method S100 to the localization map for the common reference frame. More specifically, in the inter-object variant of the method S100, the device can: add the first reference object to the localization map for the common reference frame; and add the second reference object to the localization map for the common reference frame 10. Device Tracking Generally, upon establishing a common reference frame, a first device in the pair of devices can: continue to track its location in the common reference frame over time based on odometry data recorded at the first device; and update a localization map of a second device based on its tracked location. Thus, by operating within the common reference frame, each device in the pair of devices can receive updates of the second device's location regardless of whether the second device is within the field of view of the camera of the first device.

11. Updating the Common Reference Frame

Generally, once a device has established a common reference frame with a second device, the device can continually refine the rotation matrix and translation matrix to transform its own reference frame into the common reference frame. More specifically, the pair of devices can continually execute Blocks of the method S100 to update the reference vectors and consequently the rotation matrix and translation matrix when the reference objects are within the field of view of the device's camera. Additionally, a first device can: detect when a reference object (or second device) reappears within the field of view of the first device and can, at that time, execute Blocks of the method to update reference vectors and, consequently, the rotation matrix and the translation matrix. Alternatively, the device can update the common reference frame and execute Blocks of the method S100 upon receiving an input from the user coinciding with a depiction of a reference object in a video feed displayed at the device.

In particular, a first device can: record a series of odometry data; localize the first device at a location based on the odometry data; record a series of images (or a video feed); detecting a third object depicted in the series of images; identify the third object as a reference object; and update the common reference frame of the first device and the second device based on the position of the reference object.

In the inter-device variant of the method S100, the first device can update the common reference frame in response to detecting the second device in the field of view of the first device and receiving confirmation from the second device that the second device concurrently detects the first device within the field of view of the second device.

In the inter-object variant of the method S100, the first device can update the common reference frame in response to detecting the first reference object and the second reference object and receiving confirmation from the second device that the second device concurrently detects the first reference object and the second reference object.

In one implementation, the device can automatically detect the first reference object, the second reference object (in the inter-object variant) or the second device (in the inter-device variant) based on an object signature of the first reference object, an object signature of the second reference object, and/or an object signature for the second device (or the second user associated with the second device). In particular, the device can: calculate a unique object signature associated with the second device (or a human associated with the second device) based on an image or video feed depicting the second device; detect an unidentified object depicted in the video feed of the first device; calculate an object signature for the unidentified object; calculate a similarity value between the object signature for the unidentified object and the unique object signature associated with the second device; and, in response to detecting a similarity value greater than a threshold similarity value (i.e. substantial similarity) between the object signatures, execute Blocks of the method S100 to update the common reference frame between the first device and the second device.

11.1 Based on Localization Map

In one implementation, once a device can access a localization map in the common reference frame populated with objects that may have been detected by any device operating in the shared augmented reality session corresponding to the common reference frame, the device can calculate a local instance of a localization map in its reference frame in order to update the device's position and orientation in the common reference frame. More specifically, if the relative positions of objects in the devices local localization map do not align with the localization map for the common reference frame, then the device can estimate a rotation matrix and/or translation matrix to correct the local version of the localization map and thereby update the reference frame of the device.

Thus, a first device can: record a series of images (or a video feed); detect an object depicted in the series of images; estimate a location of the object; and, in response to characterizing the object as static, add the object in association with the third location to a localization map for the common reference frame. Subsequently, a second device can record a second series of images; detect the object in the second series of images; and re-localize in the common reference frame based on the location of the object.

Furthermore, devices can distinguish objects in their on-device localization maps and compare them to objects in the localization map of the common reference frame by matching object signatures stored in association with object locations in the localization map. Thus, the device can identify that a particular constellation of objects in its on-device localization map does not align with the most recent version of the localization map of the common reference frame and can update its reference frame to match the common reference frame based on the position and orientation of the constellation of objects relative to the device.

In particular, the device can detect an unidentified object at an estimated location; calculate an object signature of the unidentified object; compare the object signature of the unidentified object to object signatures in a localization map for the common reference frame; and, in response to the object signature of the unidentified object matching the unique object signatures of a particular object in the localization map, identify the unidentified object as the particular object.

12. Augmented Reality Assets

As shown in FIGS. 2 and 3, if the remote server returns an augmented reality asset linked to an asset detected by the device in a current or last image recorded by the camera, then the server can verify that rules for rendering this augmented reality asset are met and project this augmented reality asset into the viewfinder or display on the device accordingly.

In one implementation, the remote server returns augmented reality assets for the space occupied by the device to the device. For example, the remote server can return to the device augmented reality assets linked to fixed or immutable objects in the space (e.g., walls, tables, fixed art installations, trees) near the location of the device and/or within or near the field of view of the camera in the device predicted by the remote server based on the device's location. The device can then cache these augmented reality assets and selectively overlay them over or adjacent corresponding static or immutable objects detected by the device in 2D images subsequently recorded by the camera. The remote server can also return to the device: augmented reality assets linked to dynamic and immutable (or "mobile") objects represented directly in the current sparse 3D map received from the device; and/or augmented reality assets linked to dynamic or immutable objects predicted to occupy the space with the device, regardless of whether the device has yet detected these objects.

The device then: caches these augmented reality assets received from the remote server; and selectively projects (e.g., "overlays") these assets on 2D images recorded by the camera based on signatures of objects detected in these images, whether these objects are immutable or mutable. The device can then render these augmented reality assets within these 2D images based on a set of rendering rules (e.g., a position and orientation of the augmented reality asset relative to the object); and then displays the augmented images at the display of the device. For example, each augmented reality asset can be spatially-referenced to the common reference frame for the 3D localization map. Upon receipt of a next 2D image recorded by the camera, the device can: implement methods and techniques described above to identify an object linked to a particular augmented reality asset stored in the cache; calculate a 3D position of the object relative to the device (e.g., relative to the optical axis and optical sensor of the camera); match the particular object to a particular augmented reality asset stored in the cache; and then verify that the particular object fulfills rules designated for this particular augmented reality asset. If so, then the device can: combine the position of the particular object relative to the device with the last transform received from the remote server and representing a last calculated position and orientation of the device relative to the virtual origin of the common reference frame to derive an object transform representing the position and orientation of the particular object relative to the virtual origin; and project the particular augmented reality asset onto the current 2D image based on the object transform.

Furthermore, for a dynamic and mutable object detected in this 2D image and associated with an augmented reality asset, the device can project this augmented reality asset onto this 2D image based on the position of this object relative to the camera calculated by the app. The device can repeat these processes for other immutable and mutable objects detected in this 2D image before rendering this augmented 2D image on the device's display substantially in real-time.

As described above, the device can continue to access 2D images recorded by the camera, transform these 2D images into sparse 3D maps, and return these sparse 3D maps to the remote server; and the remote server can continue to localize the device based on the sparse 3D map, return the location of the device to the device (e.g., in the form of a transform between the virtual origin and the calculated position and orientation of the device), and return augmented reality assets and related rules to the device as the device nears or enters positions and orientations associated with these augmented reality assets. Upon receipt of additional augmented reality assets and locations of the device, the device can store these additional augmented reality assets in the cache and selectively project augmented reality assets from the cache onto subsequent 2D images recorded by the camera.

The first device can, therefore: record a video feed; render the video feed at a display or viewfinder of the device; and, in response to receiving a user input associated with an area of the video feed, generate augmented reality content at a designated location in the common reference frame corresponding to the area of the second image. The second device can then: record a second video feed; render the video feed; and, in response to a field of view of the second device encompassing the designated location in the common reference frame, augment the second video feed with the augmented reality content.

12.1 Location and Environmental Triggers

In addition to generating augmented reality assets for display to the user, the device can also execute other actions in response to localization in the common reference frame. For example, if the common reference frame is defined relative to absolute locations (e.g., the interior of a store) and/or orientations (e.g., north, south, east, west), then the device can access information in response to the particular location context of the device.

In one implementation, the device can detect its absolute geographic location based on its location in the common reference frame and can download contextual information corresponding to its geographic location for display to the user. For example, if the device detects that it is located at a particular stage of a music festival, the device can download the set list for the stage and display the list to the user. However, the device can perform any location related task in response to detecting its location in the common reference frame.

Additionally or alternatively, the device can identify particular objects within its local vicinity in order to determine a location context for the device and display or otherwise present information to the user in response to the location context. For example, the device can detect an arrangement of chairs and desks around the device; determine that the device is located in an office and access office related content for presentation to the user (e.g. a work-related audio playlist).

13. Adding New Users to the Augmented Reality Session

Generally, after the first and second device execute Blocks of the method S100 to establish a common reference frame, a third device can execute Blocks of the method S100 in order to synchronize the reference frame of the third device with the common reference frame. More specifically, the third device can execute Blocks of the method S100 in coordination with either the first device or the second device in order to expand the number of devices operating in the common reference frame and participating in the augmented reality session.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for establishing a common reference frame amongst devices comprising, at a first device:
   recording a first image;
   detecting a first object in the first image;
   rendering the first image;
   receiving a selection of the first object depicted in the first image;
   associating the first object with a second device based on the selection of the first object; and
   in response to the selection:
      recording a first series of odometry data;
      at a first coordination time, estimating a first location of the first device in a reference frame of the first device based on the first series of odometry data;
      recording a first series of images;
      at the first coordination time, estimating a second location of the second device in the reference frame of the first device based on the first series of images;
      calculating a first reference vector in the reference frame of the first device defining the second location of the second device relative to the first location of the first device;
      receiving, from the second device, a second reference vector in the reference frame of the second device defining the first location of the first device relative to the second location of the second device;
      calculating a rotation and an offset between the second reference vector and the first reference vector; and
      transforming the reference frame of the first device to the common reference frame matching the reference frame of the second device based on the rotation and the offset.

2. The method of claim 1 further comprising, at the second device:
  recording a second image;
  detecting a second object in the second image;
  rendering the second image;
  receiving a selection of the second object depicted in the second image;
  associating the second object with the first device based on the selection of the second object; and
  in response to the selection:
    recording a second series of odometry data;
    at a coordination time, estimating a second location of the second device in a reference frame of the second device based on the second series of odometry data;
    recording a second series of images;
    at the coordination time, estimating the first location of the first device in the reference frame of the second device based on the second series of images; and
    calculating a second reference vector in the reference frame of the second device defining the first location of the first device relative to the second location of the second device; and
    transmitting, from the second device, the second reference vector in the reference frame of the second device.

3. The method of claim 1, wherein:
  detecting the first object in the first image further comprises detecting a first human in the first image;
  receiving the selection of the first object depicted in the first image further comprises receiving a selection of the first human in the first image;
  associating the first object with the second device based on the selection of the first object further comprises identifying the first human as a user of the second device based on the selection of the first human; and
  estimating the second location of the second device in the reference frame of the first device based on the first series of images further comprises:
    estimating a centroid location of the user of the second device in the reference frame of the first device based on the first series of images; and
    estimating the second location of the second device in the reference frame of the first device based on the centroid location of the user of the second device and a typical offset between a device and a centroid of a user.

4. The method of claim 1:
  further comprising augmenting the first image in real time to graphically identify the first object in the first image to generate a first augmented image; and
  wherein rendering the first image further comprises rendering the first augmented image; and
  wherein receiving the selection of the first object depicted in the first image further comprises detecting a touch gesture over the first object depicted in the first image displayed on a touchscreen of the first device.

5. The method of claim 4, wherein:
  recording the first image further comprises recording a first video feed comprising the first image;
  detecting the first object in the first image further comprises tracking the first object in the first video feed;
  augmenting the first image in real time to graphically identify the first object in the first image to generate the first augmented image further comprises augmenting the first video feed in real time to graphically identify the first object in the first video feed to generate a first augmented video feed;
  rendering the first augmented image further comprises rendering the first augmented video feed in real time; and
  receiving the selection of the first object depicted in the first image further comprises receiving the selection of the first object depicted in the first video feed.

6. The method of claim 1, further comprising:
  recording a second series of odometry data;
  localizing the first device based on the second series of odometry data at a third location in the common reference frame;
  recording a second series of images comprising a second image;
  detecting a third object in the second image;
  rendering the second image;
  receiving a selection of the third object depicted in the second image;
  associating the third object with the second device based on the selection of the first object;
  at a second coordination time subsequent to the first coordination time:
    estimating a fourth location of the second device in the reference frame of the first device based on the second series of images; and
    calculating a third reference vector in the reference frame of the first device defining the fourth location of the second device relative to the third location of the first device;
  receiving, from the second device, a fourth reference vector in the reference frame of the second device defining the third location of the first device relative to the fourth location of the second device;
  calculating a second rotation and a second offset between the third reference vector and the fourth reference vector; and
  updating the common reference frame for the first device and the second device based on the second rotation and the second offset.

7. The method of claim 1 further comprising:
  calculating a unique object signature associated with the first object based on the first image;
  recording a second series of odometry data;
  localizing the first device based on the second series of odometry data at a third location in the common reference frame recording a second series of images comprising a second image;
  at a second coordination time subsequent to the first coordination time:
    detecting an object in the second image;
    calculating an object signature for the object in the second image based on the second image;
    in response to calculating substantial similarity between the unique object signature and the object signature for the object in the second image:
      associating the object in the second image with the second device;
      estimating a fourth location of the second device in the reference frame of the first device based on the second series of images; and
      calculating a third reference vector in the reference frame of the first device defining the fourth location of the second device relative to the third location of the first device;
    receiving, from the second device, a fourth reference vector in the reference frame of the second device defining the third location of the first device relative to the fourth location of the second device;

calculating a second rotation and a second offset between the third reference vector and the fourth reference vector; and updating the common reference frame for the first device and the second device based on the second rotation and the second offset.

8. The method of claim 1 further comprising:

at the first device:
recording a first video feed;
rendering the first video feed comprising a second image; and
in response to detecting a user input associated with an area of the second image, generating augmented reality content at a designated location in the common reference frame corresponding to the area of the second image;

at the second device:
recording a second video feed;
rendering the second video feed comprising a third image;
in response to a field of view of the third image encompassing the designated location in the common reference frame, augmenting the third image with the augmented reality content to generate an augmented third image; and
rendering the augmented third image.

9. The method of claim 1 further comprising, at the second device:

recording a second image;
detecting a second object in the second image;
rendering the second image;
receiving a selection of the second object depicted in the second image;
associating the second object with a third device based on the selection of the second object; and
in response to the selection:
recording a second series of odometry data;
at a second coordination time, estimating a third location of the second device in the common reference frame based on the second series of odometry data;
recording a second series of images;
at the second coordination time, estimating a fourth location of the third device in the common reference frame based on the second series of images; and
calculating a third reference vector in the common reference frame defining the fourth location of the third device relative to the third location of the second device;
receiving, from the third device, a fourth reference vector in the reference frame of the third device defining the third location of the second device relative to the fourth location of the third device;
calculating a second rotation and a second offset between the third reference vector and the fourth reference vector; and
transforming the reference frame of the third device to the common reference frame matching based on the rotation and offset.

10. The method of claim 1, wherein:

estimating the second location of the second device in the reference frame of the first device based on the first series of images further comprises:
identifying the first device in the first series of images based on an image classifier;
estimating a two-dimensional bounding box in the first series of images encompassing the first object in the first series of images;
ray casting within the two-dimensional bounding box in the first series of images to generate a point cloud for the first object;
estimating a three-dimensional bounding box encompassing the point cloud for the first object;
calculating a centroid of the three-dimensional bounding box; and
estimating the second location of the second device based on the centroid.

11. A method for establishing a common reference frame amongst devices comprising, at a first device:

recording a first image;
detecting a first object in the first image;
rendering the first image;
receiving a selection of the first object depicted in the first image;
identifying the first object as a first reference object based on the selection of the first object;
recording a second image;
detecting a second object in the second image;
rendering the second image;
receiving a selection of the second object depicted in the second image;
identifying the second object as a second reference object based on the selection of the second object;
in response to the selection of the first object and the selection of the second object:
recording a first series of images;
at the first coordination time;
estimating a first location of the first reference object in the reference frame of the first device based on the first series of images; and
estimating a second location of the second reference object in the reference frame of the first device based on the first series of images;
calculating a first reference vector in the reference frame of the first device defining the second location of the second reference object relative to the first location of the first reference object;
receiving, from a second device, a second reference vector in the reference frame of the second device defining the second location of the second reference object relative to the first location of the first reference object;
calculating a rotation and an offset between the first reference vector and the second reference vector; and
transforming the reference frame of the first device to a common reference frame matching the reference frame of the second device based on the rotation and the offset.

12. The method claim 11, further comprising, at the second device:

recording a third image;
detecting a third object in the third image;
rendering the third image;
receiving a selection of the third object depicted in the third image;
identifying the third object as the first reference object based on the selection of the third object;
recording a fourth image;
detecting a fourth object in the fourth image;
rendering the fourth image;
receiving a selection of the fourth object depicted in the fourth image;
identifying the fourth object as the second reference object based on the selection of the second object;

in response to the selection of the third object and the selection of the fourth object:
    recording a second series of images;
    at the first coordination time;
        estimating the first location of the first reference object in the reference frame of the second device based on the second series of images; and
        estimating the second location of the second reference object in the reference frame of the second device based on the second series of images;
    calculating the second reference vector in the reference frame of the second device defining the second location of the second reference object relative to the first location of the first reference object; and
    transmitting, from the second device, the second reference vector in the reference frame of the second device.

13. The method of claim 12, further comprising:
at the first device:
    prompting a first user of the first device to designate the first reference object and communicate the first reference object to a second user of the second device;
    prompting the first user to designate the second reference object and communicate the second reference object to the second user;
    prompting the first user to select the first reference object in the first image; and
    prompting the second user to select the second reference object in the second image;
at the second device:
    prompting the second user to select the first reference object in the third image; and
    prompting the second user to select the second reference object in the fourth image.

14. The method of claim 12:
further comprising, at the first device:
    calculating a first unique object signature for the first object; and
    calculating a second unique object signature for the second object;
wherein, at the second device:
    identifying the third object as the first reference object further comprises:
        calculating an object signature for the third object; and
        in response to the object signature for the third object substantially matching the first unique object signature, identifying the third object as the first reference object;
    identifying the fourth object as the second reference object further comprises:
        calculating an object signature for the fourth object; and
        in response to the object signature for the fourth object substantially matching the second unique object signature, identifying the fourth object as the second reference object.

15. The method of claim 11, wherein:
estimating the first location of the first reference object in the reference frame of the first device based on the first series of images further comprises:
    defining a characterization of the first reference object as static;
    calculating a first threshold distance based on the characterization of the first reference object;
    for each image in the first series of images:
        estimating a current centroid of the first reference object;
        in response to detecting that the current centroid of the first reference object is within the first threshold distance of a previously calculated centroid of the first reference object; and
        updating a current estimated location of the first reference object; and
    at the coordination time, estimating the first location based on a most recent current estimated position of the first reference object.

16. The method of claim 15, wherein calculating the first threshold distance further comprises calculating the first threshold distance based on a size of the first reference object and the characterization of the first reference object.

17. The method of claim 11, further comprising:
at the first device:
    recording a second series of images comprising a third image;
    detecting a third object in the third image;
    estimating a third location of the third object in the common reference frame;
    in response to characterizing the third object as static, adding the third object to a localization map for the common reference frame at the third location;
at the second device:
    recording a third series of images comprising a fourth image;
    detecting the third object in the third image at the third location; and
    re-localizing in the common reference frame based on the third location.

18. The method of claim 17:
further comprising, at the first device, calculating a unique object signature for the third object;
wherein detecting the third object in the third image at the third location further comprises:
    detecting an unidentified object at approximately the third location;
    calculating an object signature of the unidentified object; and
    in response to the object signature of the unidentified object substantially matching the unique object signature of the third object, identifying the unidentified object as the third object.

19. The method of claim 11, further comprising, in response to characterizing the first reference object and the second reference object as static:
    adding the first reference object to a localization map for the common reference frame at the first location; and
    adding the second reference object to the localization map for the common reference frame at the second location.

20. The method of claim 19, further comprising:
at a third device:
    detecting the first location of the first reference object in a reference frame of the third device;
    detecting the second location of the second reference object in a reference frame of the third device;
    calculating a third reference vector in the reference frame of the third device defining the second location of the second reference object relative to the first location of the first reference object;
    receiving a fourth reference vector defining the second location of the second reference object relative to the first location of the first reference object in the common reference frame;

calculating a third rotation and a third offset between the third reference vector and the fourth reference vector; and transforming the reference frame of the third device to the common reference frame based on the third rotation and the third offset.

\* \* \* \* \*